United States Patent
Shields et al.

(10) Patent No.: US 11,067,050 B2
(45) Date of Patent: Jul. 20, 2021

(54) VEHICLE POWER RELAY STARTUP CONTROL AND DIAGNOSTIC

(71) Applicant: FORD GLOBAL TECHNOLOGIES, LLC, Dearborn, MI (US)

(72) Inventors: Mark Shields, Plymouth, MI (US);
Josephine S. Lee, Novi, MI (US);
Jagmohan Singh, Ypsilanti, MI (US);
William David Treharne, Ypsilanti, MI (US); George Hart Vrampas, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 430 days.

(21) Appl. No.: 15/596,235

(22) Filed: May 16, 2017

(65) Prior Publication Data
US 2018/0335007 A1    Nov. 22, 2018

(51) Int. Cl.
*F02N 11/00* (2006.01)
*F02N 11/08* (2006.01)

(52) U.S. Cl.
CPC .................. *F02N 11/0848* (2013.01)

(58) Field of Classification Search
CPC ...... F02N 11/0848; B60L 11/08; B60L 11/14; B60L 11/1803; B60L 11/1809; B60K 6/22; B60K 2006/268
USPC .............. 290/11; 322/20; 307/10.1
See application file for complete search history.

(56) References Cited

U.S. PATENT DOCUMENTS

| | | | |
|---|---|---|---|
| 6,828,755 B1 * | 12/2004 | Iverson | H01M 16/00 320/104 |
| 7,389,837 B2 | 6/2008 | Tamai et al. | |
| 7,400,059 B2 * | 7/2008 | Algrain | F01M 5/02 307/10.1 |
| 7,761,198 B2 * | 7/2010 | Bhardwaj | F02N 11/0866 104/34 |
| 9,024,469 B2 * | 5/2015 | Nakajima | B60R 16/033 307/9.1 |
| 2003/0191576 A1 * | 10/2003 | Zarei | B60K 6/485 701/105 |
| 2009/0096285 A1 * | 4/2009 | Acena | B60L 11/005 307/10.1 |
| 2012/0104768 A1 * | 5/2012 | Gibson | B60L 1/003 290/36 R |
| 2014/0306659 A1 * | 10/2014 | Nakajima | B60L 11/1805 320/109 |

* cited by examiner

Primary Examiner — Julio C. Gonzalez
(74) Attorney, Agent, or Firm — David B. Kelley; Brooks Kushman P.C.

(57) ABSTRACT

A hybrid vehicle includes an isolation switch disposed between a first bus that is electrically coupled to a starter for an engine and a second bus that is electrically coupled to a power converter and accessory loads. The hybrid vehicle includes a controller programmed to normally command the switch closed, and, in response to expiration of a predetermined time interval without starting the engine, command the switch to open for a predetermined duration to perform diagnostics on the isolation switch.

13 Claims, 3 Drawing Sheets

VEHICLE POWER RELAY STARTUP CONTROL AND DIAGNOSTIC

TECHNICAL FIELD

This application generally relates to operating a vehicle power relay/switch during startup of a vehicle to permit diagnosis of the power relay/switch.

BACKGROUND

Switches and relays that are used in a vehicle electrical system may be operated in an opened or closed state. The status of the switches and relays may be monitored during vehicle operation. For example, a relay that is commanded to be closed may be monitored to confirm that the relay is closed. Such monitoring can provide an alert to a driver as to the presence of any relays that do not appear to be functioning properly.

SUMMARY

A hybrid vehicle includes a switch disposed between a first bus electrically coupled to a starter for an engine and a second bus electrically coupled to a power converter. The hybrid vehicle includes a controller programmed to command the switch to close, and, in response to a voltage of the second bus exceeding a voltage threshold after initiating an ignition cycle that begins without starting the engine, command the switch to open for a predetermined duration.

The voltage threshold may be indicative of the power converter operating to transfer power from a high-voltage bus to the second bus. The voltage threshold may be a value that is expected to be predetermined amount greater than a nominal battery voltage of a battery electrically coupled to the first bus. The controller may be further programmed to, in response to operating the starter to crank the engine, command the switch to open. The controller may be further programmed to, in response to engine cranking being completed, compare a voltage of the first bus to the voltage of the second bus and output a diagnostic indication to a display if a difference between the voltage of the second bus and the voltage of the first bus is less than a predetermined difference while the switch is commanded to open. The controller may be further programmed to compare a voltage of the first bus to the voltage of the second bus. The controller may be further programmed to output a diagnostic indication to a display in response to a difference between the voltage of the second bus and the voltage of the first bus being less than a predetermined difference while the switch is commanded open.

A hybrid vehicle power distribution system includes a first bus electrically coupled to a starter for an engine and a second bus electrically coupled to a power converter. The hybrid vehicle power distribution system includes a switch disposed between the first bus and the second bus. hybrid vehicle power distribution system includes a controller programmed to open the switch during engine starting, and, in response to expiration of a predetermined time without starting the engine, command the switch open for a predetermined duration.

The controller may be further programmed to otherwise command the switch closed. The controller may be further programmed to command the switch open in response to a voltage of the second bus exceeding a voltage threshold indicative of the power converter providing power to the second bus before expiration of the predetermined time. The predetermined duration may be greater than one second. The controller may be further programmed to, in response to the starter being inactive, compare a voltage of the first bus to a voltage of the second bus. The controller may be further programmed to output a diagnostic indication to a display in response to a difference between the voltage of the second bus and the voltage of the first bus being less than a predetermined difference while the switch is commanded open. The predetermined time may be increased after a first instance of commanding the switch open.

A method for a vehicle with a hybrid powertrain includes commanding, by a controller, a switch, being normally closed and disposed between a first bus providing power to a starter for an engine and a second bus receiving power from a power converter, to open for a predetermined duration in response to initiating an ignition cycle in which the hybrid powertrain is in a run mode without starting the engine.

The method may further include measuring, by the controller, a voltage of the first bus and a voltage of the second bus while the switch is commanded open. The method may further include outputting, by the controller, a diagnostic indicator to a display in response to a difference between the voltage of the second bus and the voltage of the second bus being less than a predetermined difference while the switch is commanded open. The method may further include commanding, by the controller, the switch to close in response to expiration of the predetermined duration. The method may further include commanding, by the controller, the switch to open in response to operating the starter to crank the engine. The method may further include outputting, by the controller, a diagnostic indicator to a display in response to the engine being in a run mode and a difference between a voltage of the second bus and a voltage of the first bus being less than a predetermined difference.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
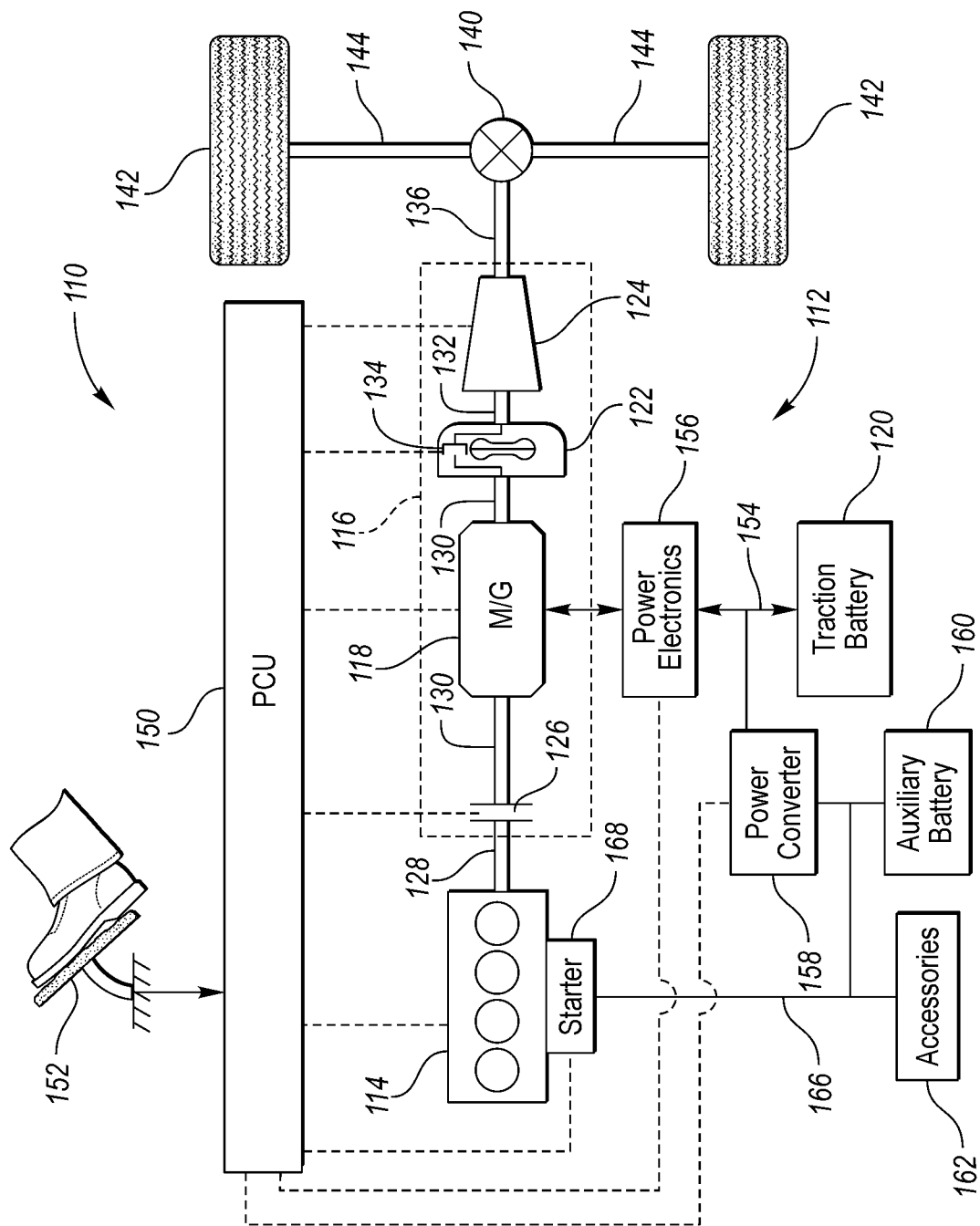
FIG. 1 is a block diagram of a vehicle with a hybrid powertrain.

Referring to FIG. 1, a schematic diagram of a hybrid electric vehicle (HEV) 110 is illustrated according to an embodiment of the present disclosure. FIG. 1 illustrates representative relationships among the components. Physical placement and orientation of the components within the vehicle may vary. The HEV 110 includes a powertrain 112. The powertrain 112 includes an engine 114 that drives a transmission 116, which may be referred to as a modular hybrid transmission (MHT). As will be described in further detail below, transmission 116 includes an electric machine such as an electric motor/generator (M/G) 118, an associated traction battery 120, a torque converter 122, and a multiple step-ratio automatic transmission, or gearbox 124.

The engine 114 and the M/G 118 are both drive sources for the HEV 110. The engine 114 generally represents a power source that may include an internal combustion engine such as a gasoline, diesel, or natural gas powered engine, or a fuel cell. The engine 114 generates an engine power and corresponding engine torque that is supplied to the M/G 118 when a disconnect clutch 126 between the engine 114 and the M/G 118 is at least partially engaged. The M/G 118 may be implemented by any one of a plurality of types of electric machines. For example, M/G 118 may be a permanent magnet synchronous motor. Power electronics 156 condition direct current (DC) power provided by the traction battery 120 to the requirements of the M/G 118, as will be described below. For example, power electronics may provide three phase alternating current (AC) to the M/G 118.

When the disconnect clutch 126 is at least partially engaged, power flow from the engine 114 to the M/G 118 or from the M/G 118 to the engine 114 is possible. For example, the disconnect clutch 126 may be engaged and M/G 118 may operate as a generator to convert rotational energy provided by a crankshaft 128 and M/G shaft 130 into electrical energy to be stored in the traction battery 120. The disconnect clutch 126 can also be disengaged to isolate the engine 114 from the remainder of the powertrain 112 such that the M/G 118 can act as the sole drive source for the HEV 110. The M/G shaft 130 extends through the M/G 118. The M/G 118 is continuously drivably connected to the M/G shaft 130, whereas the engine 114 is drivably connected to the M/G shaft 130 only when the disconnect clutch 126 is at least partially engaged.

The M/G 118 is connected to the torque converter 122 via M/G shaft 130. The torque converter 122 is therefore connected to the engine 114 when the disconnect clutch 126 is at least partially engaged. The torque converter 122 includes an impeller fixed to M/G shaft 130 and a turbine fixed to a transmission input shaft 132. The torque converter 122 thus provides a hydraulic coupling between shaft 130 and transmission input shaft 132. The torque converter 122 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 134 may also be provided that, when engaged, frictionally or mechanically couples the impeller and the turbine of the torque converter 122, permitting more efficient power transfer. The torque converter bypass clutch 134 may be operated as a launch clutch to provide smooth vehicle launch. Alternatively, or in combination, a launch clutch similar to disconnect clutch 126 may be provided between the M/G 118 and gearbox 124 for applications that do not include a torque converter 122 or a torque converter bypass clutch 134. In some applications, disconnect clutch 126 is generally referred to as an upstream clutch and launch clutch 134 (which may be a torque converter bypass clutch) is generally referred to as a downstream clutch.

The gearbox 124 may include gear sets (not shown) that are selectively placed in different gear ratios by selective engagement of friction elements such as clutches and brakes (not shown) to establish the desired multiple discrete or step drive ratios. The gearbox 124 may provide a predetermined number of gear ratios that may range from a low gear (e.g., first gear) to a highest gear (e.g., Nth gear). An upshift of the gearbox 124 is a transition to a higher gear. A downshift of the gearbox 124 is a transition to a lower gear. The friction elements may be controlled according to a shift schedule that sequences connecting and disconnecting certain elements of the gear sets to control the ratio between a transmission output shaft 136 and the transmission input shaft 132. The gearbox 124 is automatically shifted from one ratio to another based on various vehicle and ambient operating conditions by an associated controller 150, such as a powertrain control unit (PCU). The gearbox 124 then provides powertrain output torque to output shaft 136.

It should be understood that the hydraulically controlled gearbox 124 used with a torque converter 122 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 124 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 136 is connected to a differential 140. The differential 140 drives a pair of wheels 142 via respective axles 144 connected to the differential 140. The differential 140 transmits approximately equal torque to each wheel 142 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 112 may further include an associated powertrain control unit (PCU) 150. While illustrated as one controller, the PCU may be part of a larger control system and may be controlled by various other controllers throughout the vehicle 110, such as a vehicle system controller (VSC). It should therefore be understood that the powertrain control unit 150 and one or more other controllers can collectively be referred to as a "controller" that controls various actuators in response to signals from various sensors to control functions such as starting/stopping engine 114, operating M/G 118 to provide wheel torque or charge the traction battery 120, select or schedule transmission shifts, etc. Controller 150 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 150 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller (PCU) 150 may communicate signals to and/or from engine 114, disconnect clutch 126, M/G 118, launch clutch 134, transmission gearbox 124, and power electronics 156. Although not explicitly illustrated, those of ordinary skill in the art will recognize various functions or components that may be controlled by the controller (PCU) 150 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 126, launch clutch 134, and transmission gearbox 124, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 134 status (TCC), deceleration or shift mode (MDE), for example.

Control logic or functions performed by the controller (PCU) 150 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as the PCU 150. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 152 is used by the driver of the vehicle to provide a demanded torque, power, or drive command to propel the vehicle 110. In general, depressing and releasing the accelerator pedal 152 generates an accelerator pedal position signal that may be interpreted by the controller 150 as a demand for increased power or decreased power, respectively. Based at least upon input from the pedal, the controller 150 commands torque from the engine 114 and/or the M/G 118. The controller 150 also controls the timing of gear shifts within the gearbox 124, as well as engagement or disengagement of the disconnect clutch 126 and the torque converter bypass clutch 134. Like the disconnect clutch 126, the torque converter bypass clutch 134 can be modulated across a range between the engaged and disengaged positions. This produces a variable slip in the torque converter 122 in addition to the variable slip produced by the hydrodynamic coupling between the impeller and the turbine. Alternatively, the torque converter bypass clutch 134 may be operated as locked or open without using a modulated operating mode depending on the particular application.

To drive the vehicle 110 with the engine 114, the disconnect clutch 126 is at least partially engaged to transfer at least a portion of the engine torque through the disconnect clutch 126 to the M/G 118, and then from the M/G 118 through the torque converter 122 and gearbox 124. The M/G 118 may assist the engine 114 by providing additional power to turn the shaft 130. This operation mode may be referred to as a "hybrid mode" or an "electric assist mode."

To drive the vehicle 110 with the M/G 118 as the sole power source, the power flow remains the same except the disconnect clutch 126 is operated to isolate the engine 114 from the remainder of the powertrain 112. Combustion in the engine 114 may be disabled or otherwise OFF during this time to conserve fuel. The traction battery 120 transmits stored electrical energy through a high-voltage (HV) bus 154 to a power electronics module 156 that may include an inverter, for example. The high-voltage bus 154 includes wiring and conductors for conducting current between modules and may include a positive-side conductor and a negative- or return-side conductor. The power electronics 156 convert DC voltage from the traction battery 120 into AC voltage to be used by the M/G 118. The controller 150 commands the power electronics 156 to convert voltage from the traction battery 120 to an AC voltage provided to the M/G 118 to provide positive or negative torque to the shaft 130. This operation mode may be referred to as an "electric only" operation mode.

In any mode of operation, the M/G 118 may act as a motor and provide a driving force for the powertrain 112. Alternatively, the M/G 118 may act as a generator and convert kinetic energy from the powertrain 112 into electric energy to be stored in the traction battery 120. The M/G 118 may act as a generator while the engine 114 is providing propulsion power for the vehicle 110, for example. The M/G 118 may additionally act as a generator during times of regenerative braking in which rotational energy from wheels 142, while rotating, is transferred back through the gearbox 124 and is converted into electrical energy for storage in the traction battery 120.

It should be understood that the schematic illustrated in FIG. 1 is merely exemplary and is not intended to be limiting. Other configurations are contemplated that utilize selective engagement of both an engine and a motor to transmit torque through the transmission. For example, the M/G 118 may be offset from the crankshaft 128, an additional motor may be provided to start the engine 114, and/or the M/G 118 may be provided between the torque converter 122 and the gearbox 124. Other configurations are contemplated without deviating from the scope of the present disclosure. Other hybrid vehicle configurations are possible (e.g., power-split configuration) and the inventive aspects disclosed herein are applicable to these other configurations.

The vehicle 110 may utilize the M/G 118 to start the engine 114. The controller 150 may command the disconnect clutch 126 to close and request torque from the M/G 118 via the power electronics 156. The torque from the M/G 118 rotates the engine 114 so that the engine speed increases above a predetermined speed at which time the engine 114 may be commanded to provide fuel and spark to maintain continued engine rotation. The torque converter 122 may provide some torsional isolation during engine cranking and initial startup. In some vehicle configurations, a low-voltage starter motor 168 may also be coupled to the engine 114 to provide a secondary or backup means of starting the engine 114.

The vehicle 110 may further include a power converter module 158 and an auxiliary battery 160. The auxiliary battery 160 may be a low-voltage battery such as a 12 Volt battery that is commonly used in automobiles. Terminals of the auxiliary battery 160 may be electrically coupled to a low-voltage bus 166. The low-voltage bus 166 includes wiring and conductors for conducting current between connected modules. The power converter 158 may be electrically coupled between the high-voltage bus 154 and the low-voltage bus 166. The power converter module 158 may be a DC/DC converter that is configured to convert voltage from the high-voltage bus 154 to a voltage level compatible with the low-voltage bus 166. The power converter 158 may be further configured to convert voltage from the low-voltage bus 166 to voltage compatible with the high-voltage bus 154. For example, the power converter 158 may be configured to provide a two-way flow of current between the high-voltage bus 154 and the low-voltage bus 166.

The vehicle 110 may include a display. For example, the display may be a part if an instrument panel. The display may include lamps, lights and/or other indicators for alerting the operator of conditions related to the vehicle. The display may be a liquid crystal display (LCD) module. The display may be in communication with controllers (e.g., PCU 150) that are coupled to a communication bus.

Figure 2:
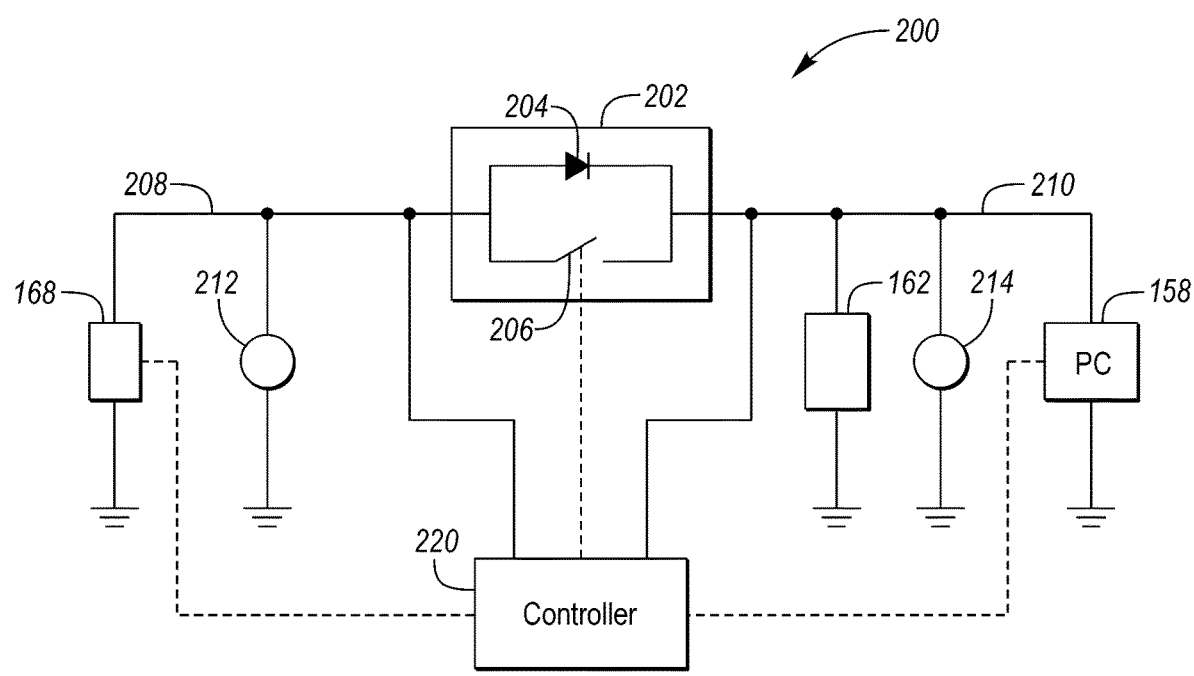
FIG. 2 is a diagram of a low-voltage power distribution system for a vehicle.

FIG. 2 depicts a possible configuration for a hybrid vehicle power distribution system 200. The power distribution system 200 may include an isolation switch 202 that is configured to selectively isolate and couple a first electrical bus 208 and a second electrical bus 210. The first electrical bus 208 may be referred to as the first bus or the engine crank-side bus. The second electrical bus 210 may be referred to as the second bus or the vehicle 12 Volt load-side bus. Electrically coupled to the first electrical bus 208 may be electrical components that are related to starting the engine 114. The first electrical bus 208 may be referred to as the engine crank power bus. The first electrical bus 208 may provide power to electrical components that are used for engine cranking. For example, the starter 168 may be electrically coupled to first electrical bus 208. During engine cranking (e.g., starter being operated), the voltage of first electrical bus 208 may be reduced as the starter 168 draws current. For example, starter inrush currents may cause voltage spikes. The voltage spikes may cause issues with operation of electrical components that are coupled to the same bus. A first battery 212 may be electrically coupled to the first electrical bus 208. The first battery 212 may be sized for supporting a current draw of starter 168 during engine crank events.

Electrically coupled to the second electrical bus 210 may be other electrical components/accessories 162. The electrical components 162 may include electrical and electronic systems that control braking, steering, and powertrain functions. Further, systems for lighting may be coupled to the second electrical bus 210. The electrical components 162 may include those electrical devices that are not related to engine cranking. A second battery 214 may be electrically coupled to the second electrical bus 210. The second battery 214 may be sized for powering the electrical loads 162. In some configurations, the electrical components 162 may include those electrical devices that are not involved in engine cranking. An output of the power converter 158 may be coupled to the second electrical bus 210. The power converter 158 may transfer power from the high-voltage bus 154 to the second electrical bus 210.

The isolation switch 202 may be a solid-state device. For example, the isolation switch 202 may be represented by a diode 204 in parallel with a switching element 206. The switching element 206 may be a transistor (e.g., metal oxide semiconductor field effect transistor (MOSFET)). The isolation switch 202 may be configured such that the switching element 206 is normally closed. In some configurations, the switching element 206 may be a relay. The switching element 206 may be configured such that, when closed, current may flow from the second electrical bus 210 to the first electrical bus 208. The isolation switch 202 may be referred to as a vehicle power relay.

The diode 204 may be configured so that current may flow from the first electrical bus 208 to the second electrical bus 210, but current flow in the opposite direction is prevented. When a voltage of the first electrical bus 208 is greater than a voltage of the second electrical bus 210, current may flow from the first electrical bus 208 to the second electrical bus 210. Current flow from the second electrical bus 210 to the first electrical bus 208 may be blocked when the switching element 206 is opened. Closing the switching element 206 may couple the first electrical bus 208 and the second electrical bus 210. When the switching element 206 is closed, current flow from the second electrical bus 210 to the first electrical bus 208 may be permitted.

The switching element 206 may be electrically coupled to a controller 220. For example, a MOSFET has a gate terminal that may be driven by an output from the controller 220. A relay may have a coil that may be driven by an output from the controller 220. The controller 220 may include appropriate circuitry to operate the switching element 206. For example, the controller 220 may include gate drive circuitry to drive the gate terminal of a transistor device. The controller 220 may be included as an integral part of the isolation switch 202 or may be a control module external to the isolation switch 202. The controller 220 may command the switching element 206 to open and close by sending a corresponding signal to the switching element 206. For example, the controller 220 may drive current through a relay coil of a normally closed relay that should cause the relay to open.

Under normal vehicle operation conditions, the first electrical bus 208 and the second electrical bus 210 may be electrically coupled together. The isolation switch 202 may be configured to be normally closed. That is, the switching element 206 may in a normally closed state. The controller 220 may be configured to command the isolation switch 202 to close at vehicle start up. Operation in this manner permits bi-directional current flow between the first electrical bus 208 and the second electrical bus 210. This allows the first battery 212 and the second battery 214 to both be coupled to the buses. In addition, the power converter 158 may also provide power for the second electrical bus 210 and the first electrical bus 208. When the isolation switch 202 is closed, the first battery 212 may be charged by power received from the power converter 158.

During engine cranking events, the controller 220 may be configured to command the isolation switch 202 to open. That is, the switching element 206 may be commanded to open. This prevents current from flowing from the second electrical bus 210 to the first electrical bus 208. This prevents the large inrush currents that are present during engine cranking from affecting the second electrical bus 210. For example, if the second electrical bus 210 is already operating with a large current draw that is near the output current limit of the power converter 158, the additional current draw may cause a decrease in the voltage of the second electrical bus 210. Since safety-related electrical devices may be operating, it may be desired to minimize the voltage disturbances on the second electrical bus 210. For example, it may be desired to maintain the second electrical bus 210 at a voltage level that permits continued operation of electronic modules related to autonomous driving features Eliminating the impact of engine cranking on the second electrical bus 210 also prevents flickering of lights that are connected to the second electrical bus 210.

To ensure that the isolation switch 202 is operating properly, it may be useful to periodically determine the operational status of the isolation switch 202. The controller 220 may be configured to determine if the isolation switch 202 is in the state in which it is commanded (e.g., open when commanded to open, closed when commanded to close). The operational status of the isolation switch 202 may be monitored when the isolation switch 202 is closed or open. As the isolation switch 202 may be normally closed, monitoring of the status when closed may be performed at any time. Monitoring of the status of the isolation switch 202 may be performed by monitoring the voltages of the first electrical bus 208 and the second electrical bus 210. The controller 220 may include a first voltage sensing circuit that is coupled to the first electrical bus 208. The controller 220 may include a second voltage sensing circuit that is coupled to the second electrical bus 210. The voltage sensing circuits may be configured to scale and filter the voltage inputs. The voltage sensing circuits may provide signals to an analog-to-digital converter so that the voltages may be converted to digital values.

When the isolation switch 202 is closed, the voltage of the first electrical bus 208 and the voltage of the second electrical bus 210 may be expected to be at a similar voltage level. The voltages may be expected to be within a predetermined amount of one another. For example, the voltages may be expected to be within one volt of one another when the isolation switch 202 is in the closed state. If the difference between the voltages is less than or equal to the predetermined amount when the isolation switch 202 is commanded closed, then the isolation switch 202 may be diagnosed to be operating properly in the closed state. If the difference between the voltages exceeds the predetermined amount for a predetermined duration, the isolation switch 202 may be diagnosed to be stuck in the open state (e.g., not closed when commanded to be closed).

As the isolation switch 202 may be normally closed, there may be fewer opportunities to check the isolation switch 202 in the open state. Further, it may be desired to know that the isolation switch 202 is fully functional at the start of an ignition cycle. An ignition cycle may be defined as a period of time starting when the powertrain is placed into a ready for propulsion mode until the powertrain is placed in an off mode. For example, the ignition cycle may be defined when a key is inserted and rotated to a run position until a time in which the key is rotated to an off position. In the run position, the powertrain may be in the ready for propulsion mode. In the ready for propulsion mode, the hybrid powertrain may be operated by engine-only, electric-only, or a combination of engine and electric operation.

The operating mode of the hybrid powertrain at the initiation of the ignition cycle may be determined by the PCU 150 based on a variety of conditions. Under certain conditions, the hybrid powertrain may start the engine 114 upon initiation of the ignition cycle. Starting the engine 114 may include operating the starter 168 to crank the engine 114. For example, the PCU 150 may operate the starter by applying a voltage/current to the starter 168. The conditions for starting the engine 114 upon initiation of the ignition cycle may include ambient temperature below a threshold (e.g., cold weather) and/or traction battery state of charge below a threshold. However, under some conditions, the engine 114 may be not be started upon initiation of the ignition cycle. For example, a plug-in hybrid may not immediately start the engine 114 until the state of charge of the traction battery 120 falls below a threshold. Under these conditions, the hybrid powertrain may operate in an electric-only propulsion mode upon initiation of the ignition cycle. It may be desired to diagnose the isolation switch 202 at the start of every ignition cycle to ensure that both operating states of the isolation switch 202 are functioning.

Diagnosing the isolation switch 202 may also be performed when the isolation switch 202 is commanded to be open. The controller 220 may be configured to command the isolation switch 202 to open during an engine crank event. The controller 220 may receive an engine crank command and, in response to receiving the engine crank command, command the isolation switch 202 to open. When the isolation switch 202 is opened, the voltage on each side of the isolation switch 202 may be measured and compared. When the isolation switch 202 is opened, the voltage of the first electrical bus 208 may be the voltage of the first battery 212. The voltage of the second electrical bus 210 may depend on the voltage of the second battery 214 and the voltage output of the power converter 158. The power converter 158 may be controlled to output a predetermined voltage level for the second electrical bus 210 (e.g., 13.5 Volts). The predetermined voltage level may be a calibratable value.

The controller 220 may be configured to compare the voltage of the first electrical bus 208 and the voltage of the second electrical bus 210 when predetermined conditions are satisfied. The predetermined conditions may include conditions in which the voltages are expected to be different. For example, when the power converter 158 is operating and supporting the second electrical bus 210, the voltages may be expected to be different when the isolation switch 202 is opened. To charge the first battery 212 and the second battery 214, the voltage output of the power converter 158 may need to exceed the battery voltages. The voltage of the first electrical bus 208 may settle to a voltage level of the first battery 212 when the isolation switch 202 is opened (e.g., 12 Volts). Further, during engine cranking, the voltage of the first electrical bus 208 may decrease as current is drawn by the starter 168. The second electric bus 210 may be supported by the output of the power converter 158. As such, no voltage drop is expected on the second electrical bus 210 during engine cranking. The controller 220 may determine the difference between the voltage of the second electrical bus 210 and the first electrical bus 208. If the difference exceeds a predetermined threshold, then the isolation switch 202 may be diagnosed as operating properly in the open state. If the difference is less than or equal to the predetermined threshold, the isolation switch 202 may be diagnosed as stuck in the closed state.

The controller 220 may also monitor the voltages prior to and during engine cranking and determine a relative voltage change caused by engine cranking on each bus. The voltage of the first electrical bus 208 may be expected to decrease during engine cranking. The voltage of the second electrical bus 210 may be expected to remain approximately the same during engine cranking. The controller 220 may determine the change in voltage caused by engine cranking on each electrical bus. If the voltage of the first electrical bus 208 decreases by greater than a predetermined amount while the voltage of the second electrical bus 210 changes less than a second predetermined amount, then the isolation switch 202 may be diagnosed as functioning properly in the open state. If the voltage of the first electrical bus 208 decreases by less than the predetermined amount or the voltage of the second electrical bus 210 changes by more than the second predetermined amount, then the isolation switch 202 may be diagnosed as stuck in the closed state.

In some configurations, monitoring of the voltages of the first electrical bus 208 and the second electrical bus 210 may be inhibited during engine cranking. Comparing the voltages may be delayed until engine cranking is completed. That is, the diagnostic may be delayed until the engine is in a run mode. During engine cranking, the voltage of the first electrical bus 208 may vary. Further, in the event of the isolation switch 202 being stuck open, high current draws may cause a large voltage drop across the isolation switch 202 making it difficult to detect the stuck open condition.

Additional measures may be taken when the hybrid powertrain is operated in the electric-only mode immediately after initiation of the ignition cycle. Since the engine 114 is not started, the normal open test of the isolation switch 202 may not be performed. The controller 220 may be configured to initiate opening the isolation switch 202 to diagnose the operation before an engine start is to be performed. In addition, the controller 220 may be programmed to perform the test periodically during intervals in which the engine 114 is not started (e.g., long periods of electric-only operation).

The controller 220 may be programmed to open the isolation switch 202 for a predetermined duration in response to initiating an ignition cycle in which the hybrid powertrain is in a run mode without starting the engine. The controller 220 may be configured to command the isolation switch 202 to open a predetermined amount of time after initiation of the ignition cycle if engine cranking has not been commanded. The predetermined amount of time may be an amount of time sufficient for the voltage output of the power converter 158 to stabilize and support the electrical buses. The power converter 158 may be expected to output a predetermined voltage level (e.g., 13.5 Volts). During operation, the power converter 158 may be controlled to achieve the predetermined voltage level. The predetermined voltage level may be a selectable value. For example, the power converter 158 may be commanded to control the bus voltage to the predetermined voltage level (e.g., 13.5 Volts). The controller 220 may monitor the voltage of the first electrical bus 208 and the second electrical bus 210 to determine if the voltages are near the predetermined voltage. If the voltages are near the predetermined voltage, the controller 220 may determine that the power converter 158 is supporting the bus voltage. The predetermined voltage may be a value expected to be a predetermined amount greater than a nominal battery voltage (e.g., 12 Volts) of the first battery 212. The controller 220 may be in communication with the power converter 158. The controller 220 may receive status information from the power converter 158. In response to detecting that the power converter 158 is supporting the bus voltage, the controller 220 may open the isolation switch 202 for diagnosis.

When the isolation switch 202 is opened, a voltage difference between the first electrical bus 208 and the second electrical bus 210 is expected. For example, a difference of at least one volt may be expected. If a difference greater than a predetermined amount (e.g., 1 Volt) is measured, the isolation switch 202 may be operating properly. A flag may be stored in memory indicating that the isolation switch 202 properly opens. A difference less than or equal to the predetermined amount may indicate that the isolation switch 202 has not properly opened. A flag may be stored in memory indicating that the isolation switch 202 does not properly open when commanded.

The diagnosis may be performed over a predetermined interval. The isolation switch 202 may be commanded open for the predetermined interval. For example, the predetermined interval may be one second.

When the controller 220 determines that the isolation switch 202 is stuck in a particular state, a flag indicative of the condition may be stored in memory. Further, a status may be communicated to a display in the vehicle. The display may also be part of a diagnostic tool that connects to the communication bus of the vehicle. The diagnostic tool may query the controller 220 and receive any stored diagnostic flags. For example, a lamp may be illuminated when the condition is detected. In other examples, a message may be displayed that indicates the condition. In addition, the flag may be stored in non-volatile memory for later retrieval by the controller 220. The controller 220 may also be configured to transmit the flag to a diagnostic tool as part of a diagnostic protocol.

Figure 3:
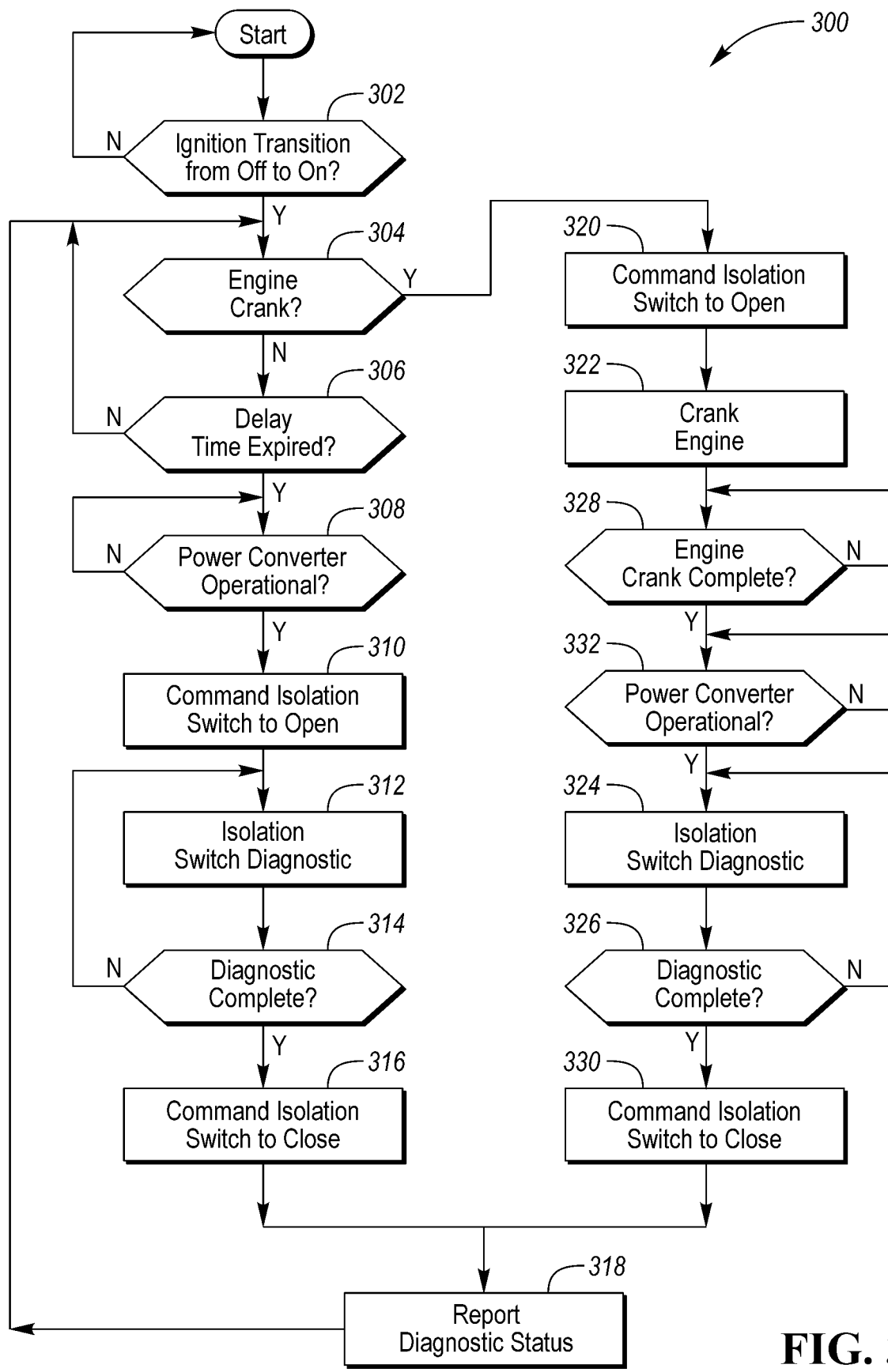
FIG. 3 is a flowchart for a possible sequence of operations for operating an isolation switch during vehicle powerup.

FIG. 3 depicts a flow chart for a possible sequence of operations that may be implemented in the controller 220. At operation 302, conditions may be monitored for a transition of the ignition from off to on. For example, a key being inserted into the ignition switch and turned to a run position. If a transition is not detected, operation 302 may be repeated. If a transition is detected, operation 304 may be performed.

At operation 304 a check is performed to determine if an engine crank is commanded. For example, a signal from the PCU 150 may indicated that an engine crank is to be performed. If an engine crank is to be performed, a sequence of operations starting with operation 320 may be performed. If an engine crank is not requested (e.g., electric-only mode) then a sequence of operation starting with operation 306 may be performed.

At operation 306, a delay time may be checked. A timer may be started upon the ignition transitioning from the off to the on state. For example, a delay time of one second may be selected to permit the vehicle systems time to monitor relevant inputs to decide if an engine crank is needed. Note that the delay time is optional and may be set to zero. The delay time may permit the system some time to initiate an engine crank. If the delay time is not expired, operation 304 may be repeated to check for an engine crank. If the delay time is expired, operation 308 may be performed. As the isolation switch test may be periodically performed during intervals without starting the engine 114, the delay time may be adjusted. For example, during periods of electric-only operation, the delay time may be set to 15 minutes. The delay time may be increased after a first instance of commanding the switch open.

At operation 308, conditions may be checked to determine if the power converter 158 is operational. For example, status information received from the power converter 158 that indicates that power is being transferred from the high-voltage bus 154 to the second electrical bus 210. The controller 220 may monitor a voltage of the second electrical bus 210 and compare the voltage to a voltage threshold. The voltage threshold may be indicative of the power converter 158 operating to transfer power from a high-voltage bus 154 to the second electrical bus 210. For example, during normal operation the power converter 158 may be configured to maintain the second electrical bus 210 at a predetermined voltage level (e.g., 13.5 Volts). The voltage threshold may be set to slightly below the normal output voltage of the power converter 158 (e.g., 13.4 Volts). The voltage threshold may be a value that is expected to be predetermined amount (e.g., 1.5 Volts) greater than a nominal battery voltage (e.g., 12 Volts) of a first battery 212 and/or the second battery 214. The power converter 158 may be determined to be operational when the voltage exceeds the voltage threshold.

If the power converter 158 is not yet operational, operation 308 may be repeated. If the power converter 158 is operational, operation 310 may be performed. At operation 310, the isolation switch 202 is commanded to open. The isolation switch 202 may be commanded to open for a predetermined duration (e.g., one second).

At operation 312, an isolation switch diagnostic is performed. The controller 220 may be programmed to measure a voltage of the first electrical bus 208 and a voltage of the second electrical bus 210. The controller 220 may be programmed to compare the voltage of the first electrical bus 208 to the voltage of the second electrical bus 210. The controller 220 may be programmed to store a diagnostic indication in response to a difference between the voltage of the second electrical bus 210 and the voltage of the first electrical bus 208 being less than a predetermined difference while the isolation switch 202 is open. For example, the predetermined difference may be one Volt. The controller 220 may be programmed to detect that the difference is less than the predetermined difference for a duration that exceeds a predetermined duration. That is, the condition is present for at least a predetermined duration before storing the diagnostic.

At operation 314, a check may be performed to determine if the diagnostic is complete. The diagnostic may be complete when the isolation switch 202 is confirmed to be operating properly or stuck closed. Completion may be detected upon expiration of the predetermined duration over which the isolation switch 202 is to be opened. If the diagnostic is not completed, operation 312 may be repeated to continue the diagnostic procedure. If the diagnostic is completed, operation 316 may be performed.

At operation 316, the isolation switch 202 may be closed. At operation 308, the diagnostic status may be reported. For example, the controller 220 may output a stored diagnostic indication to a display in the vehicle for the operator to view. If the isolation switch 202 is properly function, a diagnostic indication may not be displayed or stored.

In the event of an engine cranking operation, operation 320 may be performed. At operation 320, the isolation switch 202 may be opened. At operation 322, engine cranking may be performed by operating the starter 168 to start the engine 114. At operation 328, a check is made to determine if engine cranking is completed. For example, a check may be made to determine if the engine has transitioned to a running state. If the engine crank is not completed, operation 328 may be repeated until the engine is running. A timeout condition may be present in case the engine crank has failed completely or is aborted. At operation 332, conditions may be checked to determine if the power converter 158 is operational as discussed for operation 308. If the power converter 158 is not yet operational, operation 332 may be repeated. If the power converter 158 is operational, operation 324 may be performed. At operation 324, an isolation switch diagnostic is performed as described in relation to operation 312. At operation 326, a check may be performed to determine if the diagnostic procedure is complete. For example, the diagnostic procedure may be considered complete when the isolation switch 202 is either confirmed to be open or diagnosed as being stuck closed. If the diagnostic is not completed, operation 324 may be repeated. If the diagnostic is completed, then operation 330 may be performed. At operation 330, the isolation switch 202 may be commanded to close. At operation 318, a diagnostic indicator may be reported as previously described. After operation 318, execution may return to operation 304 to monitor for an engine crank.

The system and procedures described provide a way for monitoring the isolation switch 202 during conditions in which the isolation switch 202 may not be opened for a period of time. For example, for an extended range electric-only operation, the isolation switch 202 may not be opened for an extended period of time. The system described allows diagnosis of the isolation switch 202 in the open state early in an ignition cycle. Early diagnosis of the stuck switch allows an operator to be notified before driving conditions are present that may be impacted by the stuck switch.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hybrid vehicle power distribution system comprising:
a first bus electrically coupled to a starter for an engine;
a second bus electrically coupled to a power converter;
a switch disposed between the first bus and the second bus; and
a controller programmed to command the switch open during engine starting, and, in response to expiration of a predetermined time without starting the engine, command the switch open for a predetermined duration.

2. The hybrid vehicle power distribution system of claim 1 wherein the controller is further programmed to otherwise command the switch closed.

3. The hybrid vehicle power distribution system of claim 1 wherein the controller is further programmed to command the switch open in response to a voltage of the second bus exceeding a voltage threshold indicative of the power converter providing power to the second bus before expiration of the predetermined time.

4. The hybrid vehicle power distribution system of claim 1 wherein the predetermined duration is greater than one second.

5. The hybrid vehicle power distribution system of claim 1 wherein the controller is further programmed to, in response to the starter being inactive, compare a voltage of the first bus to a voltage of the second bus.

6. The hybrid vehicle power distribution system of claim 5 wherein the controller is further programmed to output a diagnostic indication to a display in response to a difference between the voltage of the second bus and the voltage of the first bus being less than a predetermined difference while the switch is commanded open.

7. The hybrid vehicle power distribution system of claim 1 wherein the predetermined time is increased after a first instance of commanding the switch open.

8. A method for a vehicle with a hybrid powertrain comprising:
commanding, by a controller, a switch, being normally closed and disposed between a first bus providing power to a starter for an engine and a second bus receiving power from a power converter, to open for a predetermined duration in response to initiating an ignition cycle in which the hybrid powertrain is in a run mode without starting the engine.

9. The method of claim 8 further comprising measuring, by the controller, a voltage of the first bus and a voltage of the second bus while the switch is commanded open.

10. The method of claim 9 further comprising outputting, by the controller, a diagnostic indicator to a display in response to a difference between the voltage of the second bus and the voltage of the first bus being less than a predetermined difference while the switch is commanded open.

11. The method of claim 8 further comprising commanding, by the controller, the switch to close in response to expiration of the predetermined duration.

12. The method of claim 8 further comprising commanding, by the controller, the switch to open in response to operating the starter to crank the engine.

13. The method of claim 12 further comprising outputting, by the controller, a diagnostic indicator to a display in response to the engine being in a run mode and a difference between a voltage of the second bus and a voltage of the first bus being less than a predetermined difference.

* * * * *